United States Patent Office 2,758,955
Patented Aug. 14, 1956

2,758,955
PROCESS OF PROTECTING ORGANIC MATTER AGAINST FUNGUS GROWTH BY APPLYING A CHLORINE SUBSTITUTED THIA- OR DIHYDRO-THIANAPHTHENE DIOXIDE

Oscar H. Johnson, South Charleston, and Allan M. Harvey, Charleston, W. Va., and Harry West, Middleport, N. Y., assignors to Food Machinery and Chemical Corporation, San Jose, Calif., a corporation of Delaware No Drawing. Application September 7, 1950,
Serial No. 183,672

8 Claims. (Cl. 167—33)

The present invention relates to a new class of fungicidal agents and to methods of controlling the undesired growth of fungi.

The growth of fungi in the soil, on plants, or upon seeds is in many instances extremely undesirable since the normal growth of a given plant in an environment suitable for and producing fungus growth, is often greatly reduced. Furthermore, seeds maintained in an environment wherein fungus growths flourish germinate at a rate much below the germination rate of similar seeds in an environment relatively free of fungi.

Since fungi multiply in an environment wherein the humidity is relatively high and, since the initial propagation is traceable to airborn spores, any cellulosic material containing moisture offers a convenient and susceptible locus for fungus growth.

In accordance with the present invention, the growth of fungi may be inhibited or the fungus destroyed by application to specified areas where immunization is desired of a variety of compounds stemming from thianaphthene-1-dioxide. The active compounds have been found to be those having specified and generally negative groups connecting in either the 2 or 3 position, or both, that is the non-benzonoid carbons of thianaphthene-1-dioxide, that is, in the thiophene nucleus. The groups which appear to induce the greatest fungicidal action in thianaphthene-1-dioxide are the halogen groups and particularly chlorine and bromine. Thianaphthene-1-dioxide has an empirical formula $C_8H_6SO_2$ and its structure and standard nomenclature of derivatives is represented as follows:

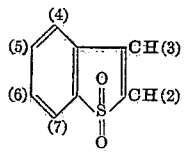

(a) Thianaphthene-1-dioxide

Or active compounds may be obtained from 2,3 dihydrothianaphthene-1-dioxide

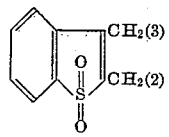

(b) 2,3 dihydrothianaphthene-1-dioxide which may be considered as an addition product of compound (a). The active fungicides have groups connected at positions 2 or 3, or both, that is, in the thiophene nucleus which substituent groups are generally negative groups, the halogen substituents being those of greatest interest and importance.

In standard nomenclature, the sulfur of the heterocyclic ring is in No. 1 position and the active halogen compounds of the materials of the class described herein are obtained by connecting active groups in the 2 or 3 position, or both.

The active fungicidal agents of the class of compounds described herein may be employed as foliage fungicides, as seed immunizers or as mildew preventatives in cellulosic and other textile fabrics.

In use, the active ingredient in finely ground form is mixed with a liquid or solid extender. Where the extender is a solid as, for instance, talc, diatomaceous earth, pyrophyllite, or other usual extender, the active ingredient may be ground with the extender to an impalpable powder and the resultant product used as a dust. For example, 1 part (by weight) of active ingredient may be ground with 200 parts of solid extender and the product applied as a dust to foliage or other material to be protected against attack by fungi.

When the active ingredient is to be applied as a spray, a dry mixture may first be prepared by grinding together the active ingredient, an inert material, and a wetting agent. This product may then be suspended in the desired amount of water. For example, 5 parts of the active agent, 4.7 parts of clay, and 0.3 parts of a wetting agent may be ground together and then mixed with 5000 parts of water to form a fungicidal spray. Alternately, the active ingredient may be dissolved in a suitable solvent such as xylene or a light hydrocarbon oil and the solution applied as a spray. Also, to a relatively concentrated solution of the active ingredient in a solvent, a wetting agent may be added and the resulting solution added to water to give an emulsion which may be applied as a spray.

The fungicidal agents of this invention may be used individually, or two or more may be used in combination, or they may be used in combination with other insect, arachnid, and disease controlling agents.

Although the class of products defined herein have been found to possess fungicidal properties, certain members of the class, by reason of their ease of production, low cost of manufacture and relatively high fungicidal efficiency, as compared with other members of the class, will be illustrated herein to show the effectiveness of the class, it being understood that the following tests are merely illustrative of the invention and are not to be deemed to be limitative thereof.

Example 1

Tomato plants were sprayed in conventional manner with a water suspension containing a low concentration of the test compound. Two concentrations were used as shown in Table I, these being 0.0075% (1 part in 13,000) and 0.625% (1 part in 160). The plants were allowed to dry and then sprayed with spores of early blight (*Alternaria solani*). After 24 hours in a high humidity chamber at 65 to 70° F., to provide conditions favorable for germination of the spores, the plants were placed in a greenhouse for several days. The number of lesions, due to the growth of the fungus, were then counted and compared with the number on plants given the same treatment except that no fungicide was applied. The reduction in the number of lesions on the plants treated with the test compound, expressed in terms of percentage, was taken as a measure of the effectiveness of the compound. The following table gives the results:

| Compound | Concentration, Percent | Control, Percent |
| --- | --- | --- |
| 2-Bromothianaphthene-1-dioxide | 0.0075 | 100 |
| 3-Bromothianaphthene-1-dioxide | 0.0075 | 100 |
| 3-Chlorothianaphthene-1-dioxide | 0.0075 | 99 |
| 3-Methoxythianaphthene-1-dioxide | 0.0075 | 43 |
| 2,3-Dibromothianaphthene-1-dioxide | 0.625 | 99 |
| 2,3-Dibromo-2,3-dihydrothianaphthene-1-dioxide | 0.0075 | 97 |
| 2,3-Dichloro-2,3-dihydrothianaphthene-1-dioxide | 0.0075 | 81 |

Example II

A series of tests similar to those described in Example I were carried out using late blight (*Phytophthera infestans*) as the fungus. In these tests, the temperature of the humidity chamber was held at 60 to 65° F., this temperature being the most favorable for infection with this organism. The following results were obtained:

| Compound | Concentration, Percent | Control, Percent |
|---|---|---|
| 2-Bromothianaphthene-1-dioxide | 0.0039 | 100 |
| 3-Bromothianaphthene-1-dioxide | 0.0039 | 97 |
| 3-Chlorothianaphthene-1-dioxide | 0.0075 | 64 |
| 2,3-Dibromothianaphthene-1-dioxide | 0.0039 | 96 |
| 2,3-Dibromo-2,3-dihydrothianaphthene-1-dioxide | 0.0037 | 76 |
| 2,3-Dichloro-2,3-dihydrothianaphthene-1-dioxide | 0.0156 | 82 |

Example III

Small potted bean plants of the Pinto variety were dusted with a finely ground mixture of the chemical being tested and an inert clay. The plants were then redusted with a spore dust prepared by diluting the spores of bean rust (*Uromyces appendiculatus*) with an inert material such as pyrophyllite. After this inoculation, the plants were subjected to conditions favorable to incubation of the spores by placing the plants for a period of 24 hours in a chamber in which the humidity was substantially 100%, and the temperature was controlled at 65 to 70° F. The plants were then placed in a greenhouse for a period of 8 to 10 days, at the end of which the number of lesions on the plants dusted with the test chemicals were compared with the number on plants dusted only with the spores. The following results were obtained:

| Compound | Concentration, Percent | Control, Percent |
|---|---|---|
| 2-Bromothianaphthene-1-dioxide | 0.5 | 87 |
| 3-Bromothianaphthene-1-dioxide | 1.0 | 100 |
| 3-Chlorothianaphthene-1-dioxide | 0.5 | 83 |
| 2,3-Dibromothianaphthene-1-dioxide | 0.5 | 97 |
| 2,3-Dibromo-2,3-dihydrothianaphthene-1-dioxide | 0.5 | 62 |

Example IV

A test similar to that described under Example I was carried out using 3-methoxythianaphthene-1-dioxide as the test chemical, apple scab (*Venturia inaequalis*) as the fungus, and apple seedlings as the host. The percent control in this case was 22.

Example V

To test the potency of the thianaphthene derivatives against soil fungi which attack seed, weighed amounts of seed were placed in glass jars with 1% by weight of the chemical under test, and thoroughly mixed. Where necessary to insure good adhesive qualities, the chemical was previously ground with approximately 10% by weight of an inert material, such as Homer clay. A known number of the seed were then planted in soil naturally infested with Pythium species, in alternate rows, with an equal number of seed treated with a fungicide used commercially for this purpose (tetrachloro-para-benzoquinone, sold under the trade name "Spergon"). After a suitable interval, the number of seed which had germinated were counted. The test chemical was evaluated by comparing on a percentage basis, the number of germinated seed in the group treated with the chemical with the number which germinated in the group treated with the commercial fungicide. The results obtained are shown in the following table:

| Compound | Relative Efficiency, Percent |
|---|---|
| 2-Bromothianaphthene-1-dioxide | 100 |
| 3-Bromothianaphthene-1-dioxide | 90 |
| 3-Chlorothianaphthene-1-dioxide | 54 |
| 3-Methoxythianaphthene-1-dioxide | 83 |
| 2,3-Dibromothianaphthene-1-dioxide | 68 |
| 2,3-Dichlorothianaphthene-1-dioxide | 14 |
| 2,3-Dibromo-2,3-dihydrothianaphthene-1-dioxide | 129 |

Although the halogen substituted, halogen additive products and the alkoxy derivatives of thianaphthene dioxide connected at the 2 or 3 positions, or both, are the preferred derivatives for use as a fungicide, other negative groups connected at these positions show fungicidal activity as, for instance, the nitro, amino, thiocyano, aryloxy, thioalkoxy and thioaryloxy. However, by reason of ease of preparation, relative cost and low phytocidal activity, the first mentioned groups are generally preferred.

In preparing the thianaphthene dioxide derivatives for use, the active ingredient is mixed with a solid extender of suitable type such as clay, diatomaceous earth, pyrophyllite, gypsolite, silica gel or any other conventional dust. A conventional wetting agent may be included with the product as is conventional practice in the manufacture of wettable dust fungicides. Usually the wettable dust will consist of about 50% active agent and 50% inert, but may vary from 25% to 75% active agent, the remainder inert material.

The extender may be a liquid, generally water, although organic solvents of relatively low boiling point may be used, including light petroleum fractions. The active agents may be present in the liquid extender in about 1 part to 800, although this may be varied over a wide range from about 1 part in 100 to 1 part in 13,000 of liquid extender, or even greater dilutions, the dilution chosen being dictated by the fungicidal efficiency of the particular active agent employed and the resistance of the fungus.

At these concentrations, the mixture of extender and active agent are applied at standard application rates used in conventional dusting and spraying operations, for instance.

For prevention of mildew on seeds, the seeds are generally dusted with a mixture of the active agent and inert solid extender as by agitation with the finely divided solid mixture. For prevention of mildew, the active agent is generally sprayed upon the textile, dried therein and the textile material then accumulated in bolts in the case of piece goods or in hanks or on spools, in the case of yarn and thread, or the textile padded therewith as by immersion with expression of the excess.

What is claimed is:

1. The method of protecting organic matter against fungus growth, which comprises applying to said matter a toxic quantity of a fungicidal composition comprising as the active ingredient a compound selected from the group consisting of thianaphthene-1-dioxide having the formula

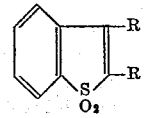

and 2,3-dihydrothianaphthene-1-dioxide having the formula

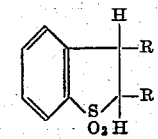

wherein R is a member of the group consisting of hydrogen, chlorine and bromine; and an inert fungicidal adjuvant as carrier for the fungicide.

2. The method of protecting organic matter against fungus growth, which comprises applying to said matter a toxic quantity of a fungicidal composition comprising a carrier and, as the essential active ingredient, a chlorine-substituted thianaphthene-1-dioxide, said chlorine being attached to a carbon atom in the five-membered ring portion of said dioxide.

3. The method of protecting organic matter against fungus growth, which comprises applying to said matter a toxic quantity of a fungicidal composition comprising a carrier and, as the essential active ingredient, a bromine-substituted thianaphthene-1-dioxide, said bromine being attached to a carbon atom in the five-membered ring portion of said dioxide.

4. The method of protecting organic matter against fungus growth, which comprises applying to said matter a toxic quantity of a fungicidal composition comprising a carrier and, as the essential active ingredient, 2-bromo-thianaphthene dioxide.

5. The method of protecting organic matter against fungus growth, which comprises applying to said matter a toxic quantity of a fungicidal composition comprising a carrier and, as the essential active ingredient, 3-bromo-thianaphthene dioxide.

6. The method of protecting organic matter against fungus growth, which comprises applying to said matter a toxic quantity of a fungicidal composition comprising a carrier and, as the essential active ingredient, 2,3-dibromo-thianaphthene dioxide.

7. The method of protecting organic matter against fungus growth, which comprises applying to said matter a toxic quantity of a fungicidal composition comprising a carrier and, as the essential active ingredient, 2,3-dibromo-2,3-dihydrothianaphthene dioxide.

8. The method of protecting organic matter against fungus growth, which comprises applying to said matter a toxic quantity of a fungicidal composition comprising a carrier and, as the essential active ingredient, 3-chloro-thianaphthene dioxide.

References Cited in the file of this patent
UNITED STATES PATENTS 2,393,925     Morris et al. _____ Jan. 29, 1946

OTHER REFERENCES

Bordwell et al.: J. Am. Chem. Soc., vol. 70, pp. 1558–1560 (1948).

Lanfry: Compt. rend., vol. 154, pp. 519–521.